United States Patent
Benton

(10) Patent No.: US 9,531,552 B2
(45) Date of Patent: Dec. 27, 2016

(54) DYNAMIC POWER REDUCTION MANAGEMENT OF NETWORK DEVICES

(71) Applicant: ARRIS Enterprises, Inc., Suwanee, GA (US)

(72) Inventor: Thomas P. Benton, Naperville, IL (US)

(73) Assignee: ARRIS Enterprises, Inc., Suwanee, GA (US)

( * ) Notice: Subject to any disclaimer, the term of this patent is extended or adjusted under 35 U.S.C. 154(b) by 67 days.

(21) Appl. No.: 14/519,203

(22) Filed: Oct. 21, 2014

(65) Prior Publication Data

US 2016/0112322 A1 Apr. 21, 2016

(51) Int. Cl.
*H04L 12/801* (2013.01)
*H04L 12/12* (2006.01)
*H04L 12/919* (2013.01)
*H04L 12/28* (2006.01)

(52) U.S. Cl.
CPC ............ *H04L 12/12* (2013.01); *H04L 47/765* (2013.01); *H04L 12/2801* (2013.01)

(58) Field of Classification Search
CPC .................................. H04L 47/12; H04L 47/11
See application file for complete search history.

(56) References Cited

U.S. PATENT DOCUMENTS

| | | | |
|---|---|---|---|
| 2006/0064722 A1* | 3/2006 | Michel | H04N 5/445 725/47 |
| 2008/0192763 A1 | 8/2008 | Davis et al. | |
| 2015/0067815 A1* | 3/2015 | Overcash | G06F 1/32 726/11 |
| 2015/0200855 A1* | 7/2015 | Overcash | H04L 47/11 370/235 |

OTHER PUBLICATIONS

PCT Search Report & Written Opinion, Re: Application No. PCT/US2015/054919, dated Dec. 7, 2015.
"IEEE 802.3ad Link Aggregation (LAG); frazier_01_0407" IEEE Draft, vol. 802.3, Apr. 20, 2007, pp. 1-13.

* cited by examiner

*Primary Examiner* — Khaled Kassim
*Assistant Examiner* — Zhaohui Yang
(74) *Attorney, Agent, or Firm* — Bart A. Perkins

(57) ABSTRACT

Power consumption levels of a network device can be adjusted based upon traffic flow at the device. A network device can recognize a situation where the traffic flow associated with a CPE device reaches a level that can be supported by a smaller channel set, and when this situation arises, the CPE device can request and receive an updated, smaller channel set. In response to receiving the smaller channel set, the CPE device can operate using fewer resources, thereby reducing power consumption at the CPE device. When traffic level at the CPE device warrants, the CPE device can request and receive a new or updated, larger channel set.

20 Claims, 4 Drawing Sheets

US 9,531,552 B2

DYNAMIC POWER REDUCTION MANAGEMENT OF NETWORK DEVICES

TECHNICAL FIELD

This disclosure relates to power reduction management of network devices.

BACKGROUND

Customer premise equipment (CPE) devices typically remain in an operating mode for extended periods of time. However, CPE devices do not generally need to be in an operating mode for the entirety of these periods of time. CPE devices are generally configured to continually operate at a level that is capable of handling a worst-case scenario traffic load. However, the traffic load of a CPE device typically varies with time. The situation can therefore arise when a CPE device is operating at a level that requires higher power consumption than necessary during periods of lighter data traffic. Therefore, it is desirable to improve upon systems and methods for dynamically managing the operational status of CPE devices.

BRIEF DESCRIPTION OF THE DRAWINGS

Like reference numbers and designations in the various drawings indicate like elements.

DETAILED DESCRIPTION

In embodiments, methods and systems can be operable to adjust power consumption levels of a network device based upon traffic flow at the device. A network device can recognize a situation where the traffic flow associated with the device reaches a level that can be supported by a smaller channel set, and when this situation arises, the network device can request and receive an updated, smaller channel set. In response to receiving the smaller channel set, the network device can operate using fewer resources, thereby reducing power consumption at the network device.

Figure 1:
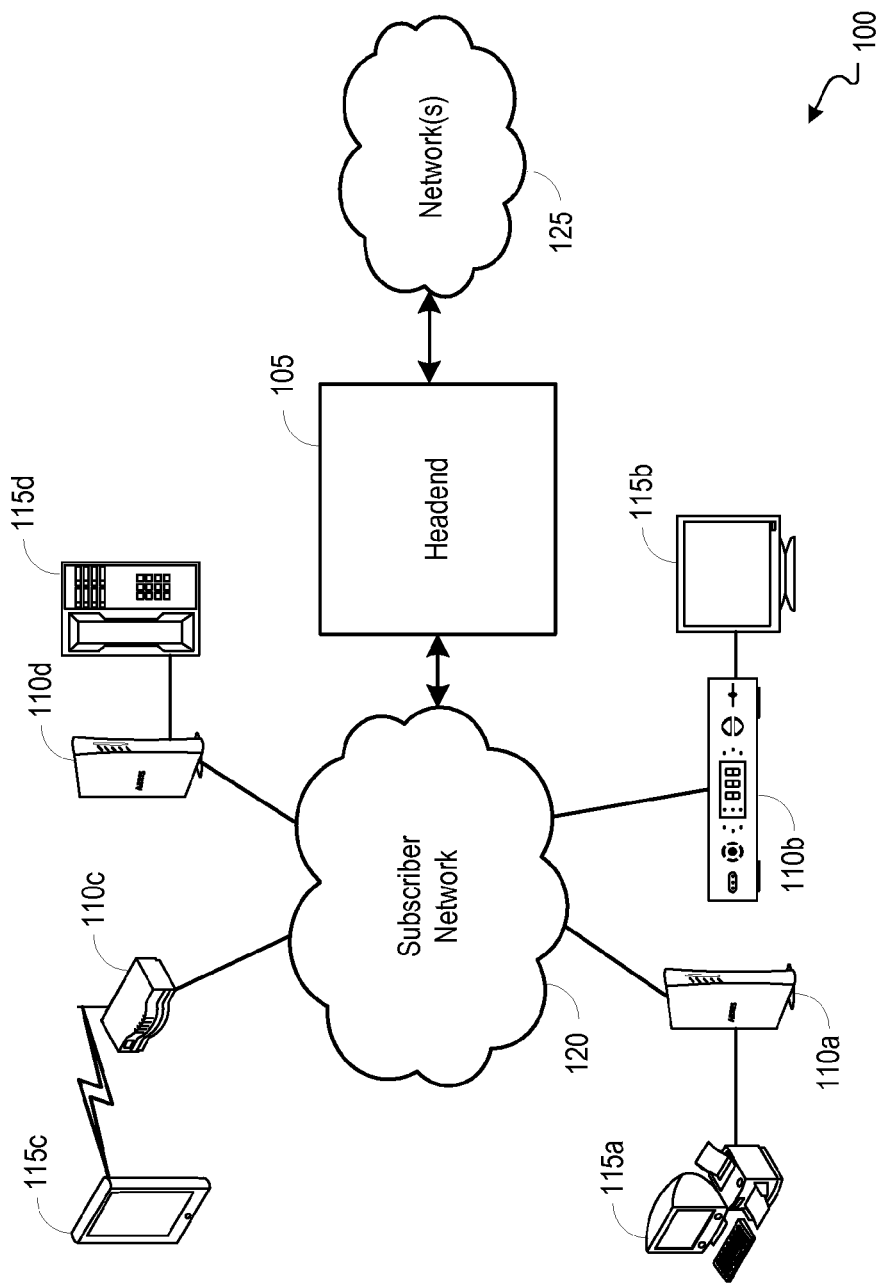
FIG. 1 is a block diagram illustrating an example network environment operable to adjust power consumption levels of a network device based upon traffic flow at the network device.

FIG. 1 is a block diagram illustrating an example network environment 100 operable to adjust power consumption levels of a network device based upon traffic flow at the network device. In embodiments, a headend 105 can provide video service(s), voice service(s) and/or data service(s) to customer premise equipment (CPE) devices 110a-d. The headend 105 may be a cable modem termination system (CMTS). The CPE devices can include, for example, a cable modem 110a, a set-top box 110b, a wireless router including an embedded cable modem 110c, or a media terminal adapter (MTA) 110d, among many others (e.g., digital subscriber line (DSL) modem, voice over internet protocol (VOIP) terminal adapter, video game console, digital versatile disc (DVD) player, mobile device, tablet, multimedia over coaxial alliance (MoCA) node, etc.). The CPE devices 110a-d can facilitate communications between the headend 105 and client devices 115a-e. A cable modem or embedded MTA (eMTA) 110a can facilitate communications from the headend 105 to a computer 115a. A set-top box 110b can facilitate communications from the headend 105 to a television 115b or a digital video recorder (DVR). A wireless router 110c can facilitate wireless communications between a mobile device or tablet 115c and a headend 105. An MTA 110d can facilitate communications between a telephone 115d and a headend 105.

The CPE devices 110a-d can communicate with the headend 105 via a subscriber network 120. In embodiments, the subscriber network 120 can be a network that facilitates Data Over Cable Service Interface Specification (DOCSIS) channel bonding, MoCA, wireless networks including 4G and long term evolution (LTE), and others. In embodiments, the subscriber network 120 can include coaxial cable using multiple channels at different frequencies, optical fiber using multiple channels at different wavelengths, air using multiple channels at different frequencies, and others.

The headend 105 can facilitate communications between one or more network(s) 125 and the CPE devices 110a-d. In embodiments, the network(s) 125 can include one or more networks internal to the headend 105 and/or one or more networks external to the headend (e.g., one or more extranets, the Internet, etc.). The network(s) 125, for example, can send data packets to and receive data packets from the headend 105 to provide content and/or services to the CPE devices 110a-d.

In embodiments, the headend 105 can deliver content and/or services to CPE devices 110a-d by way of one or more channels provided to the CPE devices via a subscriber network 120. In embodiments, a channel can represent a specific bandwidth associated with a medium for transmission of content and/or data (e.g., wireless frequency, DOCSIS channels, optical fiber channels, etc.). In embodiments, multiple channels can be bonded together as a single logical or bonded channel. It should be understood that channels may be downstream channels (e.g., channels facilitating communications from a headend 105 to a CPE device 110a-d) and/or upstream channels (e.g., channels facilitating communications from a CPE device 110a-d to a headend 105). When a CPE device 110a-d registers with the headend 105, the CPE device 110a-d can provide the headend 105 with the CPE device's channel capabilities (e.g., upstream and downstream channel bandwidth capacities). The headend 105 may then determine a channel set for the CPE device 110a-d that maximizes the CPE device's channel capabilities. For example, the headend 105 can spread downstream and upstream data associated with the CPE device across some number of downstream and/or upstream channels (e.g., the channel set size).

In embodiments, a headend 105 can provide one or more channels to a CPE device 110a-d within a channel set (e.g., a number of channels provided to a CPE device). A channel set may include a downstream channel set (e.g., receive channel set) or an upstream channel set (e.g., transmit channel set). In embodiments, the size of a channel set associated with a CPE device 110a-d can be based upon a traffic flow that the device is configured to receive, a subscription to or permission to receive certain services or traffic flows, or other parameters. For example, when traffic flow at a CPE device 110a-d drops below a certain level for a certain period of time, the CPE device 110a-d can interact with the headend 105 to reduce the size of a channel set provided to the CPE device. The size of a channel set provided to a CPE device may be reduced by reducing the number of downstream and/or upstream channels provided to the CPE device.

In embodiments, when a CPE device 110*a-d* is receiving a channel set of a reduced size and the traffic flow that is to be delivered to the CPE device 110*a-d* requires or necessitates a larger channel set, the headend 105 can increase the size of the channel set provided to the CPE device 110*a-d*. For example, while a CPE device 110*a-d* is receiving a channel set of a reduced size, the headend 105 can monitor traffic flow to the CPE device 110*a-d*, and when the traffic flow to the CPE device 110*a-d* approaches the limit of the reduced channel set (e.g., the traffic flow crosses a threshold which is less than the limit of the channel set), the headend 105 can provide the CPE device 110*a-d* with an updated, larger channel set that is capable of supporting the higher traffic flow. The size of a channel set may be increased by increasing the number of downstream and/or upstream channels provided to the CPE device. The headend 105 can update the channel set to the CPE device 110*a-d* by sending the CPE device 110*a-d* a dynamic bonding group change (DBC) message.

In embodiments, the size of a channel set being received by a CPE device 110*a-d* can necessitate the use of certain resources within the CPE device. For example, a CPE device can have multiple receivers or tuners and/or multiple transmitters, wherein each receiver or tuner is capable of receiving data via one or more channels and each transmitter is configured to output data along one or more upstream channels. Also, various circuit components can be dedicated to one or more specific receivers or tuners within a CPE device. In embodiments, resources of a CPE device that are dedicated to the reception of a channel can be powered down or otherwise limited (e.g., by placing the resources in a temporary sleep mode or other operating mode that requires less power) when the size of the CPE device's channel set is reduced. When the CPE device's channel set is increased, resources of the CPE device that are powered down or limited may be woken up or powered up based on the amount of CPE resources needed to account for the larger channel set.

In embodiments, a CPE device's power consumption can be reduced by a reduction in the size of the channel set received by the CPE device. In embodiments, the point in time and the amount by which the channel set is reduced can be based upon the level of traffic flow received by a CPE device over a period of time. For example, when traffic flow at a CPE device remains below a predetermined threshold for a predetermined period of time, the channel set received by the CPE device can be reduced and resources within the CPE device can be powered down or limited as the resources become unnecessary.

Figure 2:
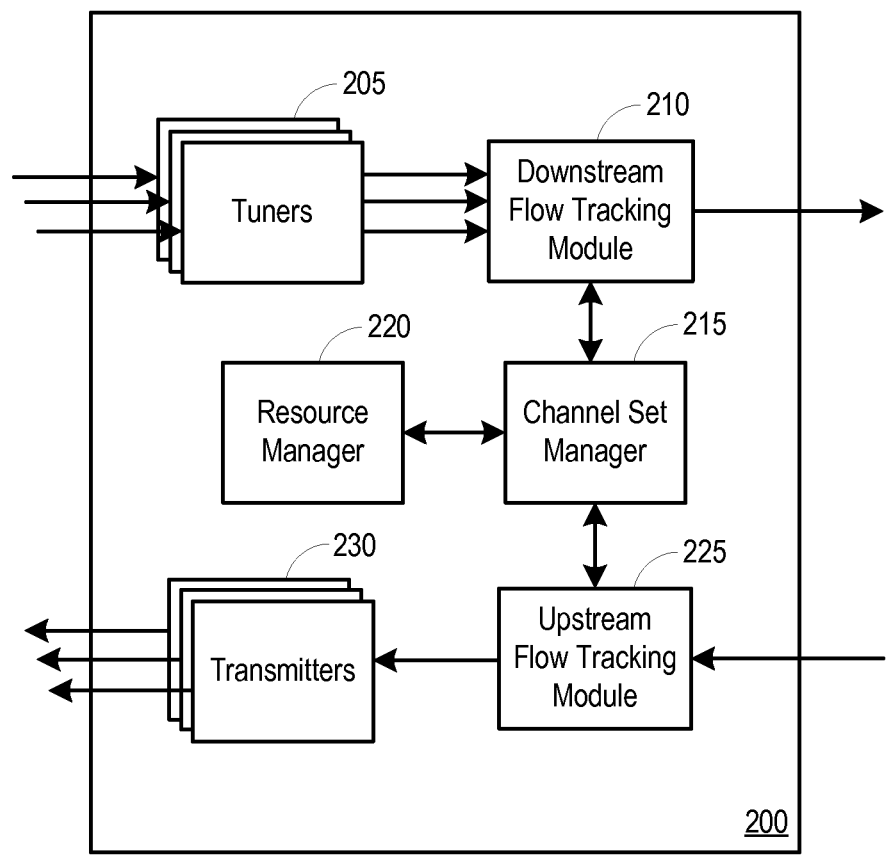
FIG. 2 is a block diagram illustrating an example component operable to adjust power consumption levels based upon traffic flow at an associated network device.

FIG. 2 is a block diagram illustrating an example component 200 operable to adjust power consumption levels based upon traffic flow at an associated CPE device. The component 200 can include one or more tuners 205, a downstream flow tracking module 210, a channel set manager 215, a resource manager 220, an upstream flow tracking module 225 and one or more transmitters 230. In embodiments, the component 200 may be a component of a CPE device 110*a-d* of FIG. 1.

In embodiments, one or more channels can be received by the component 200 through one or more tuners 205. It should be understood that a tuner 205 can receive a logical or bonded channel and that a single tuner 205 can be operable to receive multiple channels. The number of tuners 205 in use by the component 200 may be dependent on the size of the downstream channel set received by a CPE device 110*a-d* associated with the component 200.

In embodiments, upstream communications may be output from the component 200 through one or more transmitters 230. It should be understood that a CPE device 110*a-d* may be provided with an upstream channel set for outputting upstream communications. The number of transmitters 230 in use by the component 200 may be dependent on the demand for outputting upstream communications from a CPE device 110*a-d* associated with the component 200.

In embodiments, a downstream flow tracking module 210 can monitor and keep track of the downstream traffic flow received at the component 200, and an upstream flow tracking module 225 can monitor and keep track of the upstream traffic flow at the component 200. In embodiments, the traffic flow at a CPE device 110*a-d* can be measured as a number of packets that are received and/or output by the CPE device during a period of time. For example, the downstream flow tracking module 210 can maintain a count of the number of packets received by a CPE device 110*a-d* over a predetermined period of time to determine the downstream traffic flow at the CPE device during said period of time. The upstream flow tracking module 225 can maintain a count of the number of packets output upstream by a CPE device 110*a-d* over a predetermined period of time to determine the upstream traffic flow at the CPE device during said period of time.

In embodiments, a channel set manager 215 can recognize a decrease in traffic flow at the component 200 below a predetermined threshold and determine a channel set size that is capable of supporting the current traffic flow at a CPE device 110*a-d* associated with the component 200. For example, when the traffic flow at a CPE device 110*a-d* drops below a predetermined threshold for a predetermined period of time, the channel set manager 215 can make the determination that the CPE device's traffic flow can be supported by a smaller channel set (e.g., by a channel set including a smaller number of downstream and/or upstream channels than the number of downstream and/or upstream channels in the channel set currently received at the CPE device). To provide an example, the CPE device 110*a-d* may be configured to enter an energy management mode (e.g., operate using a smaller channel set) when the downstream traffic flow drops below a threshold of 5 megabits per second (Mbps) for 30 seconds or more. The CPE device 110*a-d* may be configured to enter an energy management mode when the upstream traffic flow drops below a threshold of 1 Mbps for 20 seconds or more. It should be understood that traffic flow thresholds and time periods used in the examples are only intended to provide examples, and the traffic flow thresholds and time periods may be configured differently according to factors such as particular use cases, channel capacity, and others.

As another example, when the traffic flow at the CPE device 110*a-d* increases to a predetermined threshold and remains at or above the predetermined threshold for a predetermined period of time, the channel set manager 215 can make the determination that a larger channel set should be requested to handle the traffic flow at the CPE device 110*a-d*. It should be understood that traffic flow can be monitored and smaller/larger channel sets can be requested for both downstream and upstream traffic at the CPE device 110*a-d*. To provide an example, the CPE device 110*a-d* may be configured to exit an energy management mode (e.g., operate using a larger channel set) when the downstream traffic flow exceeds a threshold of 7 megabits per second (Mbps) for 20 seconds or more. The CPE device 110a-d may be configured to exit an energy management mode when the upstream traffic flow exceeds a threshold of 2 Mbps for 15 seconds or more. It should be understood that traffic flow thresholds and time periods used in the examples are only intended to provide examples, and the traffic flow thresholds and time periods may be configured differently according to factors such as particular use cases, channel capacity, and others.

In embodiments, a resource manager 220 can identify resources associated with the component 200 and/or CPE device 110a-d associated with the component 200 that can be powered down or limited as a result of the CPE device receiving a smaller channel set. For example, the component 200 and/or a CPE device associated with the component 200 can have multiple receivers or tuners 205, wherein each receiver or tuner is capable of receiving data via a single channel. The component 200 and/or a CPE device associated with the component 200 may also have one or more transmitters 230, wherein each transmitter is capable of outputting upstream communications along one or more channels. Also, various circuit components can be dedicated to one or more specific tuners 205 or transmitters 230 within the component 200.

In embodiments, the resource manager 220 can identify and power down or otherwise limit resources of the component 200 and/or other components of an associated CPE device 110a-d (e.g., by placing the resources in a temporary sleep mode or other operating mode that requires less power) that are dedicated to the reception of a channel that is no longer required as a result of a reduction in channel set size. For example, when a downstream channel set or upstream channel set is reduced, one or more of the tuners 205 or transmitters 230 that are no longer required as a result of the smaller channel set may be powered down. It will be appreciated by those skilled in the art that resources associated with receiving downstream communications or outputting communications through an upstream channel set may be powered down or otherwise limited as a result of the CPE device's use of a smaller downstream or upstream channel set.

In embodiments, a request for a smaller channel set can be output through the one or more transmitters 230. The request for the smaller channel set can be sent within a message that is sent to a device that is providing a channel set (e.g., headend 105 of FIG. 1), and the message can request a smaller channel set. For example, the request for a smaller channel set can be included in a status message that is output to a headend 105, and the request can instruct the headend 105 to provide the CPE device 110a-d with a new channel set that contains a fewer number of channels. A new or updated channel set may be requested from the headend 105 by outputting a status message to the headend 105, wherein the status message includes a parameter instructing the headend 105 to send a new or updated channel set to the CPE device 110a-d.

Figure 3:
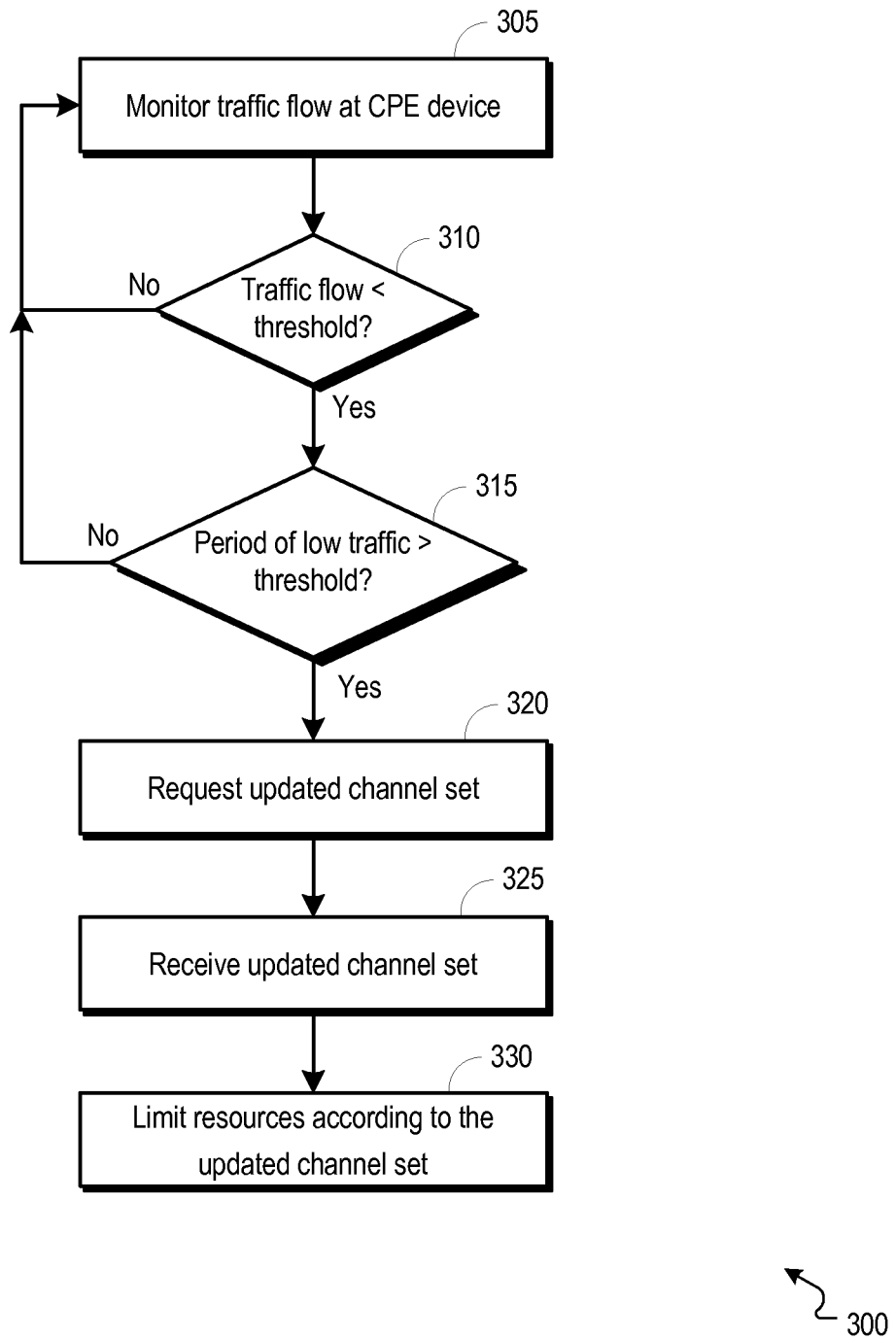
FIG. 3 is a flowchart illustrating an example process operable to adjust power consumption levels of a network device in response to traffic flow at the network device.

FIG. 3 is a flowchart illustrating an example process 300 operable to adjust power consumption levels of a network device in response to traffic flow at the network device. The process 300 can begin at 305, when traffic flow at a CPE device (e.g., CPE device 110a-d of FIG. 1) is monitored. Traffic flow at a CPE device can be monitored, for example, by a downstream flow tracking module 210 of FIG. 2 or an upstream flow tracking module 225 of FIG. 2.

In embodiments, a downstream flow tracking module 210 can monitor the rate at which packets are received by a CPE device, and an upstream flow tracking module 225 can monitor the rate at which packets are output from the CPE device. For example, a downstream flow tracking module 210 or upstream flow tracking module 225 can maintain a count of the number of packets received or output by an associated CPE device over a period of time. Traffic flow at the CPE device can be monitored by analyzing traffic flow samples of predetermined duration. For example, a configuration file loaded on the CPE device at boot up or a message received by the CPE device from a headend device may instruct the CPE device to analyze traffic flow samples of various, predetermined durations. The instructions may require that a channel set manager 215 of FIG. 2 determine and record downstream and/or upstream traffic flow during the configured predetermined durations (e.g., 1, 2, 3 second durations, etc.). In embodiments, traffic flow at the CPE device can be monitored by an upstream device (e.g., headend 105 of FIG. 1). For example, the headend 105 can maintain a count of the number of packets output to the CPE device over a period of time.

At 310, a determination can be made whether the traffic flow at the CPE device is less than a predetermined threshold. The determination whether the traffic flow at the CPE device is less than a predetermined threshold can be made, for example, by the CPE device (e.g., a channel set manager 215 of FIG. 2) or by a device upstream from the CPE device (e.g., headend 105 of FIG. 1). In embodiments, the predetermined threshold can be a level of traffic that can be supported by a smaller channel set than the channel set that the CPE device is currently receiving. In embodiments, a channel set manager 215 can compare the traffic flow at the CPE device to multiple threshold traffic levels, wherein each of the threshold traffic levels can be associated with a different channel set size that is capable of supporting the corresponding traffic level.

A higher traffic level threshold can require a larger channel set and a lower traffic level can be supported by a smaller channel set. For example, downstream traffic flow that drops below 3 Mbps may be supported by a single downstream channel, thus the downstream channel set may be reduced to a single channel. If the downstream traffic flow then exceeds 8 Mbps, as an example, the downstream channel set size may be increased to 4 downstream channels to account for the increased traffic flow. As another example, upstream traffic flow that drops below 1 Mbps may be supported by a single upstream channel, thus the upstream channel set may be reduced to a single channel. If the upstream traffic flow then exceeds 2 Mbps, as an example, the upstream channel set size may be increased to 4 upstream channels to account for the increased traffic flow. It should be understood that the channel set size capable of supporting a specific traffic flow level may vary according to different parameters including the bandwidth of channels within the channel set.

The one or more threshold traffic levels may be determined from a configuration file loaded on the CPE device at boot up or from a message received by the CPE device from a headend device. Traffic flow measured for each sample duration may be compared to the one or more threshold traffic levels. If the determination is made that the traffic flow at the CPE device is not less than a predetermined threshold, the traffic flow at the CPE device can continue being monitored at 305.

If, at 310, the determination is made that the traffic flow at the CPE device is less than a predetermined threshold, the process 300 can proceed to 315. At 315, a determination can be made whether the traffic flow at the CPE device has been less than a predetermined threshold for at least a predetermined period of time. In embodiments, a channel set manager 215 or an upstream device (e.g., headend 105 of FIG. 1) can monitor the period of time for which traffic flow at a CPE device stays at or below the predetermined threshold. When traffic flow at a CPE device remains below a threshold level for an extended period of time (e.g., 15, 20, 30 seconds, etc.), it is likely that the CPE device will continue to receive traffic at a similar rate for a sustained period of time. The predetermined period of time threshold may be determined from a configuration file loaded on the CPE device at boot up or from a message received by the CPE device from a headend device. If the determination is made that the traffic flow at the CPE device has not been less than the predetermined threshold for at least a predetermined amount of time, the traffic flow at the CPE device can continue to be monitored at 305.

If, at 315, the determination is made that the traffic flow at the CPE device has been less than the predetermined threshold for at least a predetermined period of time, the process 300 can proceed to 320. At 320, an updated or new channel set can be requested for or assigned to the CPE device. The smaller channel set to be requested can be determined, for example, by a channel set manager 215 of FIG. 2. In embodiments, when traffic flow at the CPE device reaches a threshold level, the determination is made that the current traffic flow can be supported by a smaller channel set. In embodiments, the size of the requested channel set is based upon the traffic flow at the CPE device. For example, a channel set manager 215 can compare a measured traffic flow to a plurality of predetermined traffic flow thresholds, and can select a channel set size associated with the smallest of the predetermined traffic flow thresholds that is greater than the measured traffic flow.

In embodiments, the request for the smaller channel set can be sent within a message that is sent from the CPE device to a device that is providing a channel set, and the message can request a smaller channel set. For example, a CPE device 110a-d of FIG. 1 can send a status message to a device (e.g., headend 105 of FIG. 1), wherein the status message informs the device to provide the CPE device with a new channel set that contains a fewer number of channels. A parameter may be added to a status message that instructs a headend device to provide the requesting CPE device 110a-d with a new or updated channel set. The status message may be output from the CPE device 110a-d to the headend 105 when the determination is made that the traffic flow can be supported by a different size channel set.

At 325, an updated channel set can be received by the CPE device. In response to a request for a smaller channel set or the determination that the CPE device can be supported by a smaller channel set, an upstream device (e.g., headend 105 of FIG. 1) can adjust the size of the channel set delivered to the CPE device 110a-d, and the CPE device 110a-d can receive the smaller channel set. The new or updated channel set may be sent to the requesting CPE device 110a-d as a response to a status message including a request for a new or updated channel set. For example, the headend 105 may update the downstream and/or upstream channel set at the CPE device by outputting a dynamic bonding change (DBC) message to the CPE device.

At 330, a CPE device can limit or power down resources in response to the smaller channel set. In embodiments, a resource manager 220 of FIG. 2 can identify resources associated with the CPE device 110a-d that can be powered down or limited as a result of the CPE device receiving a smaller channel set. For example, a CPE device can have multiple receivers or tuners (e.g., tuners 205 of FIG. 2) and/or multiple transmitters (e.g., transmitters 230 of FIG. 2), wherein each tuner is capable of receiving data via one or more channels and each transmitter is capable of outputting data along one or more channels. Also, various circuit components can be dedicated to one or more specific tuners or transmitters within a CPE device. In embodiments, the resource manager 220 can identify and power down or otherwise limit resources of a CPE device (e.g., by placing the resources in a temporary sleep mode or other operating mode that requires less power) that are dedicated to the reception of a channel that is no longer required as a result of a reduction in channel set size. It will be appreciated by those skilled in the art that resources associated with outputting communications through an upstream channel set may be powered down or otherwise limited as a result of the CPE device's use of a smaller upstream channel set. It should be understood that the process 300 can be modified to identify an increase in traffic flow by a predetermined amount and for a predetermined period of time, and a CPE device 110a-d can request a larger channel set from the headend 105 in anticipation of increased traffic flow for a sustained period of time.

Figure 4:
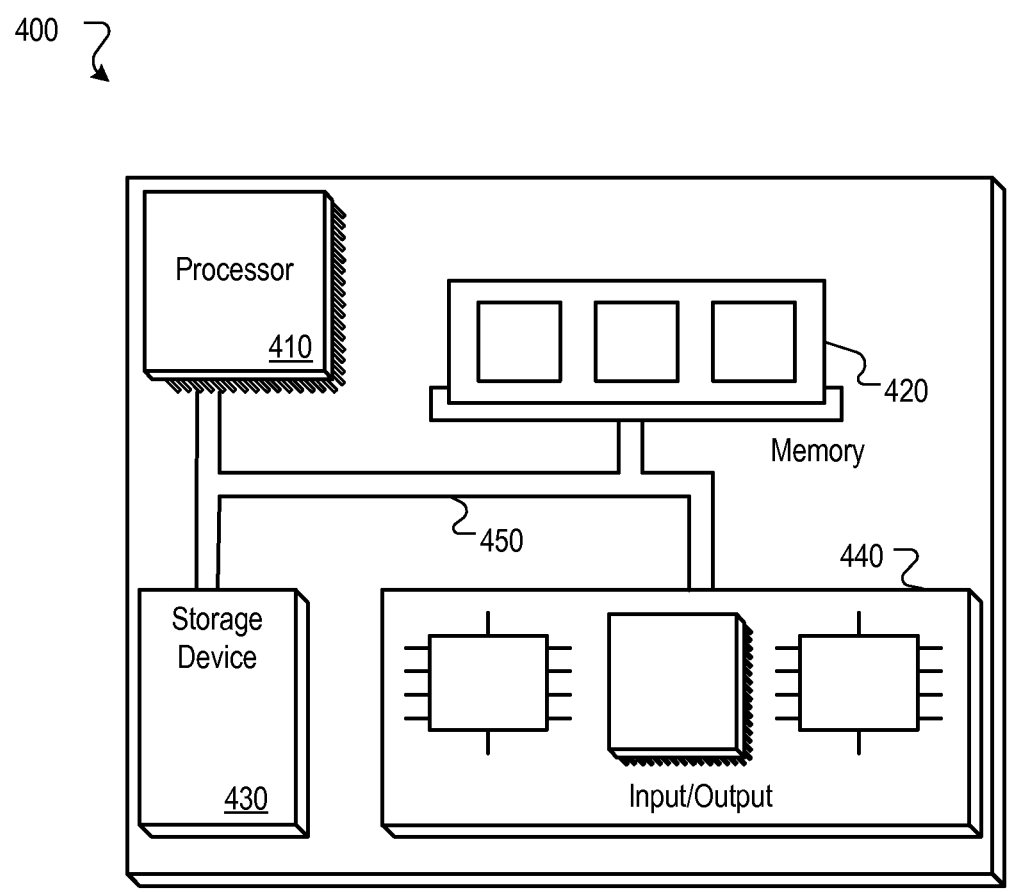
FIG. 4 is a block diagram of a hardware configuration operable to adjust power consumption levels of a network device based upon traffic flow at the network device.

FIG. 4 is a block diagram of a hardware configuration 400 operable to adjust power consumption levels of a network device based upon traffic flow at the network device. It should be understood that the hardware configuration 400 can exist in various types of devices. The hardware configuration 400 can include a processor 410, a memory 420, a storage device 430, and an input/output device 440. Each of the components 410, 420, 430, and 440 can, for example, be interconnected using a system bus 450. The processor 410 can be capable of processing instructions for execution within the hardware configuration 400. In one implementation, the processor 410 can be a single-threaded processor. In another implementation, the processor 410 can be a multi-threaded processor. The processor 410 can be capable of processing instructions stored in the memory 420 or on the storage device 430.

The memory 420 can store information within the hardware configuration 400. In one implementation, the memory 420 can be a computer-readable medium. In one implementation, the memory 420 can be a volatile memory unit. In another implementation, the memory 420 can be a non-volatile memory unit.

In some implementations, the storage device 430 can be capable of providing mass storage for the hardware configuration 400. In one implementation, the storage device 430 can be a computer-readable medium. In various different implementations, the storage device 430 can, for example, include a hard disk device, an optical disk device, flash memory or some other large capacity storage device. In other implementations, the storage device 430 can be a device external to the hardware configuration 400.

The input/output device 440 provides input/output operations for the hardware configuration 400. In one implementation, the input/output device 440 can include one or more of a network interface device (e.g., an Ethernet card), a serial communication device (e.g., an RS-232 port), one or more universal serial bus (USB) interfaces (e.g., a USB 2.0 port) and/or a wireless interface device (e.g., an 802.11 card). In another implementation, the input/output device can include driver devices configured to send communications to, and receive communications from one or more networks (e.g., subscriber network 120 of FIG. 1, network(s) 125 of FIG. 1, etc.).

Those skilled in the art will appreciate that the invention improves upon methods and apparatuses for reducing power consumption at network devices. Power consumption levels of a network device can be dynamically adjusted based upon traffic flow at the device. Methods, systems, and apparatuses described herein enable a reduction in power consumption of a CPE device by limiting or powering down CPE device resources during periods in which the CPE device can operate using a smaller channel set.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

I claim:

1. A method comprising:
monitoring traffic flow at a customer premise equipment device, wherein the traffic flow is monitored by the customer premise equipment device;
comparing the monitored traffic flow to a plurality of predetermined traffic flow thresholds, wherein each respective traffic flow threshold is associated with a channel set size capable of supporting traffic that is below the respective traffic flow threshold;
identifying a traffic flow threshold that is greater than the monitored traffic flow, wherein the identified traffic flow is the lowest traffic flow threshold of a subset of the plurality of predetermined traffic flow thresholds, the subset including one or more traffic flow thresholds that are greater than the monitored traffic flow;
if the monitored traffic flow at the customer premise equipment device is less than the identified traffic flow threshold for a predetermined period of time, outputting a request that the customer premise equipment device be provided a smaller channel set than the channel set currently provided to the customer premise equipment device, wherein the request comprises a cable modem status message that identifies the channel set size associated with the identified traffic flow threshold;
receiving an updated channel set in response to the request, wherein the updated channel set has a channel set size equivalent to the channel set size identified by the request; and limiting one or more resources at the customer premise equipment device that are not needed to support the updated channel set.

2. The method of claim 1, wherein requesting that the customer premise equipment device be provided a smaller channel set comprises outputting a status message to a headend, the status message comprising a request for a smaller channel set.

3. The method of claim 2, wherein the status message comprises a parameter instructing the headend to provide the customer premise equipment device with a smaller channel set.

4. The method of claim 1, wherein the updated channel set is received as a dynamic bonding group change message.

5. The method of claim 1, wherein limiting one or more resources at the customer premise equipment device comprises powering down the one or more resources.

6. The method of claim 1, wherein the one or more resources that are limited comprise circuitry associated with one or more tuners.

7. The method of claim 1, wherein the one or more resources that are limited comprise circuitry associated with one or more transmitters.

8. The method of claim 1, wherein the number of channels in the smaller channel set is based upon the monitored traffic flow at the customer premise equipment device.

9. The method of claim 1, further comprising:
if, while the customer premise equipment device is receiving the smaller channel set, the traffic flow at the customer premise equipment device increases beyond a predetermined threshold, requesting that the customer premise equipment device be provided a larger channel set than the updated channel set; and
removing limitations from a number of the one or more limited resources at the customer premise equipment device, wherein the number of resources from which a limitation is removed is based upon the amount of resources needed to account for the larger channel set.

10. An apparatus comprising:
an interface configured to receive a first channel set at a customer premise equipment device;
a traffic monitoring module configured to:
monitor traffic flow at the customer premise equipment device;
compare the monitored traffic flow to a plurality of predetermined traffic flow thresholds, wherein each respective traffic flow threshold is associated with a channel set size capable of supporting traffic that is below the respective traffic flow threshold;
identify a traffic flow threshold that is greater than the monitored traffic flow, wherein the identified traffic flow is the lowest traffic flow threshold of a subset of the plurality of predetermined traffic flow thresholds, the subset including one or more traffic flow thresholds that are greater than the monitored traffic flow;
if the monitored traffic flow at the customer premise equipment device is less than the identified traffic flow threshold for a predetermined period of time, request that the customer premise equipment device be provided a smaller channel set, the smaller channel set having a fewer number of channels than the first channel set, wherein the request comprises a cable modem status message that identifies the channel set size associated with the identified traffic flow threshold;
an interface configured to receive an updated channel set in response to the request wherein the updated channel set has a channel set size equivalent to the channel set size identified by the request; and
a resource module configured to limit one or more resources at the customer premise equipment device that are not needed to support the updated channel set.

11. The apparatus of claim 10, wherein requesting that the customer premise equipment device be provided a smaller channel set comprises outputting a status message to a headend, the status message comprising a request for a smaller channel set.

12. The apparatus of claim 10, wherein the number of channels in the smaller channel set is based upon the monitored traffic flow at the customer premise equipment device.

13. The apparatus of claim 10, wherein:
the traffic monitoring module is further configured to request that the customer premise equipment device be provided a larger channel set if, while the customer premise equipment device is receiving the updated channel set, the traffic flow at the customer premise equipment device increases beyond a predetermined threshold; and
the resource module is further configured to remove limitations from a number of the one or more limited resources at the customer premise equipment device, wherein the number of resources from which a limitation is removed is based upon the amount of resources needed to account for the updated channel set.

14. One or more non-transitory computer-readable media having instructions operable to cause one or more processors to perform the operations comprising:
monitoring traffic flow at a customer premise equipment device, wherein the traffic flow is monitored by the customer premise equipment device;
comparing the monitored traffic flow to a plurality of predetermined traffic flow thresholds, wherein each respective traffic flow threshold is associated with a channel set size capable of supporting traffic that is below the respective traffic flow threshold;
identifying a traffic flow threshold that is greater than the monitored traffic flow, wherein the identified traffic flow is the lowest traffic flow threshold of a subset of the plurality of predetermined traffic flow thresholds, the subset including one or more traffic flow thresholds that are greater than the monitored traffic flow;
if the monitored traffic flow at the customer premise equipment device is less than the identified traffic flow threshold for a predetermined period of time, outputting a request that the customer premise equipment device be provided a smaller channel set the channel set currently provided to the customer premise equipment device, wherein the request comprises a cable modem status message that identifies the channel set size associated with the identified traffic flow threshold;
receiving an updated channel set in response to the request, wherein the updated channel set has a channel set size equivalent to the channel set size identified by the request; and
limiting one or more resources at the customer premise equipment device that are not needed to support the updated channel set.

15. The one or more non-transitory computer-readable media of claim 14, wherein requesting that the customer premise equipment device be provided a smaller channel set comprises outputting a status message to a headend, the status message comprising a request for a smaller channel set.

16. The one or more non-transitory computer-readable media of claim 15, wherein the status message comprises a parameter instructing the headend to provide the customer premise equipment device with a smaller channel set.

17. The one or more non-transitory computer-readable media of claim 14, wherein the updated channel set is received as a dynamic bonding group change message.

18. The one or more non-transitory computer-readable media of claim 14, wherein the one or more resources that are limited comprise circuitry associated with one or more tuners.

19. The one or more non-transitory computer-readable media of claim 14, wherein the number of channels in the smaller channel set is based upon the monitored traffic flow at the customer premise equipment device.

20. The one or more non-transitory computer-readable media of claim 14, the instructions being further operable to cause the one or more processors to perform the operations comprising:
- if, while the customer premise equipment device is receiving the updated channel set, the traffic flow at the customer premise equipment device increases beyond a predetermined threshold, requesting that the customer premise equipment device be provided a larger channel set than the updated channel set; and
- removing limitations from a number of the one or more limited resources at the customer premise equipment device, wherein the number of resources from which a limitation is removed is based upon the amount of resources needed to account for the larger channel set.

* * * * *